United States Patent
Sebralla et al.

(10) Patent No.: US 11,346,002 B2
(45) Date of Patent: May 31, 2022

(54) COMPOSITION FOR COATING OF METALLIC SURFACES WITH GOOD ADHESION, IN PARTICULAR ALUMINUM MATERIALS

(71) Applicant: Chemetall GmbH, Frankfurt am Main (DE)

(72) Inventors: Lars Sebralla, Bruchköbel (DE); Stefan Birkenheuer, Frankfurt (DE); Manfred Walter, Hanau (DE); Nawel Souad Khelfallah, Frankfurt (DE)

(73) Assignee: Chemetall GmbH, Frankfurt am Main (DE)

( * ) Notice: Subject to any disclaimer, the term of this patent is extended or adjusted under 35 U.S.C. 154(b) by 875 days.

(21) Appl. No.: 15/534,637

(22) PCT Filed: Dec. 15, 2015

(86) PCT No.: PCT/EP2015/079678
§ 371 (c)(1),
(2) Date: Jun. 9, 2017

(87) PCT Pub. No.: WO2016/096777
PCT Pub. Date: Jun. 23, 2016

(65) Prior Publication Data
US 2020/0181778 A1 Jun. 11, 2020

(30) Foreign Application Priority Data

Dec. 15, 2014 (DE) ..................... 10 2014 225 801.4

(51) Int. Cl.
| | |
|---|---|
| *C23C 22/00* | (2006.01) |
| *C23C 22/34* | (2006.01) |
| *C23C 22/06* | (2006.01) |
| *C23C 22/36* | (2006.01) |
| *C23C 22/05* | (2006.01) |
| *C09D 183/04* | (2006.01) |
| *C09D 7/62* | (2018.01) |
| *C09D 133/02* | (2006.01) |

(52) U.S. Cl.
CPC ............... *C23C 22/34* (2013.01); *C09D 7/62* (2018.01); *C09D 133/02* (2013.01); *C09D 183/04* (2013.01); *C23C 22/05* (2013.01); *C23C 22/06* (2013.01); *C23C 22/361* (2013.01); *C23C 2222/20* (2013.01)

(58) Field of Classification Search
None
See application file for complete search history.

(56) References Cited

U.S. PATENT DOCUMENTS

| | | | |
|---|---|---|---|
| 2002/0086925 A1* | 7/2002 | Schmidt | .................. C23C 30/00 524/398 |
| 2004/0062873 A1 | 4/2004 | Jung et al. | |
| 2011/0100513 A1 | 5/2011 | Schlosser et al. | |
| 2013/0160898 A1 | 6/2013 | Matsuno et al. | |
| 2014/0007791 A1* | 1/2014 | Bhargava | ................. C09D 7/65 106/203.3 |

FOREIGN PATENT DOCUMENTS

| | | | | |
|---|---|---|---|---|
| CA | 2425403 A1 * | 4/2003 | ............... | C09D 5/08 |
| DE | 102005015573 A1 | 10/2006 | | |
| DE | 102005015575 A1 | 10/2006 | | |
| DE | 102011082312 A1 | 3/2012 | | |
| EP | 2151481 A1 | 2/2010 | | |
| WO | WO 0231065 A2 | 4/2002 | | |

* cited by examiner

*Primary Examiner* — Stefanie J Cohen
(74) *Attorney, Agent, or Firm* — Armstrong Teasdale LLP

(57) ABSTRACT

The present invention relates to an acidic aqueous composition for coating metallic surfaces, particularly of aluminium materials, that comprises, besides water and optionally further components, a) at least one compound selected from the group consisting of organoalkoxysilanes, organosilanols, polyorganosilanols, organosiloxanes and polyorganosiloxanes, b) at least one compound selected from the group consisting of titanium, zirconium, hafnium and aluminium compounds and silicon complex fluoride, and c) at least one copolymer which is stable at least in a segment of the pH range below 6 and which comprises, in alternating configuration, monomer units containing at least one carboxylic and/or phosphonic acid group and monomer units containing no acid group. The invention further relates to a corresponding coating method and to the use of the substrates coated by this method.

20 Claims, No Drawings

COMPOSITION FOR COATING OF METALLIC SURFACES WITH GOOD ADHESION, IN PARTICULAR ALUMINUM MATERIALS

CROSS-REFERENCE TO RELATED APPLICATIONS

This application is a National Stage entry of International Patent Application PCT/EP2015/079678, filed on Dec. 15, 2015, which application claims priority from German Application No. 10 2014 225 801.4, filed Dec. 15, 2014, the disclosures of which are incorporated herein by reference in their entirety.

The present invention relates to an aqueous acidic composition for coating metallic surfaces, and in particular aluminum materials, comprising at least one organoalkoxysilane, organosilanol, polyorganosilanol, organosiloxane and/or polyorganosilaxane and further components. The invention furthermore relates to a corresponding method and to the use of the substrates coated according to this method.

It is known to coat metallic surfaces by treating these with an aqueous composition comprising organoalkoxysilanes, the hydrolysis products and/or condensation products thereof, and further components.

The formed coatings allow anti-corrosion properties to be achieved for the treated metal substrates, as well as a certain improvement with respect to the adhesion of further coatings, such as paints.

The addition of certain acid-stable polymers to the aforementioned compositions can also be found in the prior art. In this way, the properties of the formed layers can be improved.

However, in particular in the case of surfaces made of aluminum or aluminum alloys, problems continue to occur, in particular, with paint adhesion, which so far have not been satisfactorily resolved even by the use of the aforementioned polymers.

Moreover, the known methods do not tolerate more than 80 mg/l of aluminum in the treatment bath. Due to aging of the treatment bath, which is to say due to aluminum ions, among other things, dissolving out of the treated surfaces, however, this content can be easily exceeded.

It was therefore the object of the present invention to overcome the disadvantages of the prior art, and in particular to improve the adhesion of further layers, such as paints, while achieving good anti-corrosion properties, in particular in the case of aluminum materials.

The object is achieved by a method according to the invention for coating metallic surfaces, and in particular aluminum materials, in which a metallic surface is brought in contact with a composition according to the invention.

In addition to water and optionally further components, this composition comprises components a) to c). In this,
a) is at least one compound selected from the group consisting of organoalkoxysilanes, organosilanols, polyorganosilanols, organosiloxanes and polyorganosiloxanes;
b) is at least one compound selected from the group consisting of titanium, zirconium, hafnium and aluminum compounds and silicon complex fluoride; and
c) is at least one copolymer, which is stable at least in a sub-range of the pH value below 6 and which comprises monomer units comprising at least one carboxylic acid group and/or phosphonic acid group, and monomer units comprising no acid group, in an alternating configuration.

The composition according to the invention furthermore has a pH value in the acidic range. It is thus an acidic aqueous composition.

Definitions

Within the meaning of the present invention, an "aqueous composition" shall be understood to mean a composition that, in addition to water serving as a solvent/dispersing agent, also comprises less than 50 wt./, based on the total amount of the solvents/dispersing agents, of other organic solvents/dispersing agents.

With respect to the at least one compound of component a), "organo-" shall be understood to mean at least one organic group, which is linked to a silicon atom directly via a carbon atom and, as a result, is not hydrolytically cleaved therefrom.

In connection with the at least one copolymer of component c), "stable" shall be understood to mean that this copolymer remains substantially dissolved and/or dispersed, which is to say does not precipitate to a noteworthy degree, during the treatment of the metallic surface.

Within the meaning of the present invention, "calculated as hexafluorozirconic acid" shall be understood to mean the assumption that all molecules of component b) are hexafluorozirconic acid molecules, which is to say $H_2ZrF_6$.

"Complex fluorides" shall be understood to mean not only the deprotonated forms, but also the respective monoprotonated or polyprotonated forms.

Advantageously, the composition according to the invention additionally comprises a component d). In this,
d) is at least one type of cation, selected from the group consisting of cations of metals of secondary groups 1 to 3 and 5 to 8, including lanthanides, and of main group 2 of the periodic table of elements, as well as of lithium, bismuth and tin and/or at least one corresponding compound.

The present invention also relates to a concentrate, which can be used to produce a bath for treating the metallic surface, which is to say using the composition according to the invention, by way of dilution and, if necessary, by setting the pH value.

The contents of the individual components a) to c) and, if present, d) in the concentrate are as follows:

The concentration of a) is preferably in the range of 0.05 to 10 g/l, more preferably 0.5 to 10 g/l, particularly preferably 2 to 4 g/l, and especially particularly preferably in the range of 2.5 to 3.5 g/l, calculated as silicon.

The concentration of b) is preferably in the range of 1 to 100 g/l, more preferably 20 to 75 g/l, particularly preferably 22 to 57 g/l, and especially particularly preferably in the range of 40 to 50 g/l, calculated as hexafluorozirconic acid.

The concentration of c) is preferably in the range of 1 to 200 g/l, more preferably 10 to 100 g/l, particularly preferably 10 to 50 g/l, and especially particularly preferably in the range of 15 to 20 g/l, calculated as added solid matter.

The concentration of d) is preferably in the range of 1 to 50 g/l, more preferably 7 to 35 g/l, and particularly preferably 15 to 25 g/l, calculated as the sum of the metals.

In an especially particularly preferred embodiment, the concentration of a) is in the range of 2.5 to 3.5 g/l, that of b) is in the range of 40 to 50 g/l, that of c) is in the range of 15 to 20 g/l, and that of d) is in the range of 15 to 25 g/l.

The concentrate preferably has a pH value in the range of 0.5 to 5.5, particularly preferably of 0.5 to 4, and particularly preferably of 1 to 2.

The treatment bath comprising the composition according to the invention can be obtained by diluting the concentrate with water, an aqueous solution and/or a suitable organic solvent, preferably by a factor of 1:5000 to 1:10, more preferably 1:1000 to 1:10, particularly preferably 1:300 to 1:10, and especially particularly preferably by a factor of approximately 1:100.

In the treatment bath, the contents of the individual components a) to c) and, if present, d) in the composition according to the invention are as follows:

The concentration of a) is preferably in the range of 1 to 200 mg/l, more preferably 5 to 100 mg/l, more preferably 20 to 40 mg/l particularly preferably 25 to 35 mg/l, and especially particularly preferably approximately 30 mg/l, calculated as silicon.

The concentration of b) is preferably in the range of 0.05 to 4 g/l, more preferably 0.15 to 1.5 g/l, more preferably 0.22 to 0.57 g/l particularly preferably 0.40 to 0.50 g/l, and especially particularly preferably approximately 0.45 g/l, calculated as hexafluorozirconic acid.

The concentration of c) is preferably in the range of 0.02 to 2 g/l, more preferably 0.07 to 0.7 g/l, more preferably 0.08 to 0.35 g/l, particularly preferably 0.15 to 0.20 g/l, and especially particularly preferably approximately 0.17 g/l, calculated as added solid matter.

The concentration of d) is preferably in the range of 0.02 to 2 g/l, more preferably 0.07 to 0.7 g/l, particularly preferably 0.15 to 0.25 g/l, and especially particularly preferably approximately 0.2 g/l, calculated as the sum of the metals.

The contents of components a), b) and d) can be monitored during the treatment of the metallic surfaces by way of inductively coupled plasma optical emission spectrometry (ICP-OES) or approximately by way of photometry, so that, if necessary, a metered addition of individual or multiple components can be carried out.

In a particularly preferred embodiment, the concentration of a) is in the range of 25 to 35 mg/l, that of b) is in the range of 0.40 to 0.50 g/l, that of c) is in the range of 0.15 to 0.20 g/l, and that of d) is in the range of 0.15 to 0.25 g/l.

In an especially particularly preferred embodiment, the concentration of a) is approximately 30 mg/l, that of b) is approximately 0.45 g/l, that of c) is approximately 0.17 g/l, and that of d) is approximately 0.2 g/l.

The composition according to the invention preferably has a pH value in the range of 0.5 to 5.5, more preferably of 2 to 5.5, particularly preferably of 3.5 to 5.3, and especially particularly of 4.0 to 4.8. The pH value is preferably set using nitric acid and/or ammonium.

The composition preferably comprises at least one organoalkoxysilane, organosilanol, polyorganosilanol, organosiloxane and/or polyorganosiloxane, each comprising at least one amino group, urea group, imido group, imino group and/or ureido group per organoalkoxysilane/organosilanol unit, serving as component a). It is furthermore preferred if component a) is at least one organoalkoxysilane, organosilanol, polyorganosilanol, organosiloxane and/or polyorganosiloxane, each comprising at least one, and in particular one to two amino groups per organoalkoxysilane/organosilanol unit. The organoalkoxysilane/organosilanol unit is particularly preferably 2-aminoethyl-3-aminopropyltrimethoxysilane, 2-aminoethyl-3-aminopropyltriethoxysilane, bis(trimethoxysilylpropyl)amine or bis(triethoxysilylpropyl)amine, or a combination of these. The organoalkoxysilane/organosilanol unit is especially particularly preferably 2-aminoethyl-3-aminopropyltrimethoxysilane or bis(trimethoxysilylpropyl)amine or a combination of the two.

Within the meaning of the present invention, polyorganosiloxanes shall be understood to mean compounds that can be formed with at least one organosiloxane, wherein no polydimethylsiloxane is added, and that are not silicones.

The composition preferably comprises at least one complex fluoride selected from the group consisting of the complex fluorides of titanium, zirconium, hafnium, aluminum and silicon, serving as component b).

Zirconium complex fluoride is more preferred here. It is also possible to add zirconium in the form of zirconyl nitrate, zirconyl acetate or zirconium nitrate, zirconyl nitrate being preferred. This applies correspondingly to titanium, hafnium, aluminum and silicon.

The content of the at least one complex fluoride for the concentrate is preferably in the range of 1 to 100 g/l, more preferably 20 to 75 g/l, and particularly preferably in the range of 40 to 50 g/l, calculated as hexafluorozirconic acid. For the treatment bath, the concentration is preferably in the range of 0.05 to 4 g/l, preferably 0.15 to 1.5 g/l, and particularly preferably at approximately 0.45 g/l.

In a preferred embodiment, the composition comprises at least two different complex fluorides, in particular complex fluorides of two different metal cations, and particularly preferably complex fluorides of titanium and of zirconium.

Surprisingly, it was found that the composition according to the invention tolerates more than 80 mg/l, preferably up to 300 mg/l, and particularly preferably up to 600 mg/l of aluminum (calculated as metal). This represents a major advantage, considering the aging of the treatment bath, which is to say aluminum ions dissolving out of the treated metallic surface.

The at least one copolymer of component c) comprises monomer units comprising at least one carboxylic acid group and/or phosphonic acid group, and monomer units comprising no acid groups, in an alternating configuration.

The monomer units comprising at least one carboxylic acid group and/or phosphonic acid group are, for example, (meth)acrylic acid, vinyl acetic acid, itaconic acid, maleic acid and/or vinyl phosphonic acid.

These monomer units preferably each comprise at least one carboxylic acid group. More preferably, they each comprise at least two carboxylic acid groups. Particularly preferably, they each comprise exactly two carboxylic acid groups. Maleic acid is especially particularly preferred here.

If the at least one copolymer of component c) comprises maleic acid as the monomer unit, this may partially be present in the form of the anhydride. This is the case when the copolymer added to the composition according to the invention, or to the concentrate, comprises maleic anhydride, and when no complete hydrolysis to yield maleic acid has taken place yet in the compositions according to the invention or in the concentrate.

The monomer units comprising no acid group can either be nonpolar or polar. The at least one copolymer, however, can also comprise a mixture of nonpolar and polar monomer units, serving as the monomer units comprising no acid groups.

Nonpolar monomer units that can be used are, in particular, alkylenes, such as ethylene, propylene and/or butylene, and/or styrene.

Polar monomer units that can be used are, in particular, vinyl alcohol and/or vinyl acetate and/or vinyl ether, such as methyl vinyl ether, ethyl vinyl ether, propyl vinyl ether and/or butyl vinyl ether, and/or alkylene oxides, such as ethylene oxide, propylene oxide and/or butylene oxide, and/or ethyleneimine and/or (meth)acrylate and/or (meth)acrylamide.

The length of the hydrocarbon chains in the monomer units comprising no acid group is only limited by the resulting hydrophobicity of these monomers, and thus by the water solubility of the resulting copolymers according to the invention.

The monomer units comprising no acid group are preferably vinyl ethers. Methyl vinyl ether and/or ethyl vinyl ether is more preferred here, methyl vinyl ether being particularly preferred.

By adding a copolymer that is used according to the invention, it is possible to considerably improve the properties of the formed coatings, and in particular the capability to serve as adhesion promoters for further layers.

During the treatment of the metallic surface with an acidic aqueous composition, the surface is pickled, resulting in a pH gradient having an increasing pH value toward the surface.

The copolymer comprises acid groups that at least partially dissociate at the elevated pH value on the surface. This results in negative charges at the copolymer, which, in turn, result in an electrostatic deposition of the copolymer on the metallic surface. The copolymer thus deposited serves as an adhesion mediator during the deposition of the organosiloxanes and/or polyorganosiloxanes—from component a)—and of metal oxides—from component b) and optionally component d).

The properties of the formed coatings are thereby improved. It is important, however, that the deposition of the copolymer does not cause the pickling attack on the metallic surface to be decreased to such a degree that the pH gradient is only insufficient, or completely inexistent, as is the case with the polymers used in the prior art.

The reason for this is that the pH gradient, or more specifically the increased pH value on the surface, is a prerequisite for the deposition of organosiloxanes and/or polyorganosiloxanes and metal oxides.

The negative charge density of the polymers used in the prior art is too high, whereby the deposition of these polymers on the treated metallic surface is too strong.

Even though the copolymers used according to the invention comprise groups that, after appropriate dissociation, have a negative charge, due to the alternating arrangement with neutral monomers the negative charge density is selected such that the deposition of the copolymers on the treated metallic surface is sufficient, but not too strong.

In a preferred embodiment, the composition according to the invention comprises poly(methyl vinyl ether-alt-maleic acid), serving as component c).

The copolymers used according to the invention preferably have a degree of polymerization, based on two monomer units in an alternating configuration, of 25 to 5700, more preferably of 85 to 1750, particularly preferred of 170 to 1300, and especially particularly preferably of 225 to 525. The number average molecular weight thereof is preferably 5,000 to 1,000,000 g/mol, more preferably 15,000 to 300,000 g/mol, particularly preferably 30,000 to 225,000 g/mol, and especially particularly preferably 40,000 to 90,000 g/mol.

In an especially particularly preferred embodiment, the composition comprises poly(methyl vinyl ether-alt-maleic acid) having a number average molecular weight in the range of 40,000 to 60,000 g/mol, and preferably of approximately 48,000 g/mol, serving as component c).

In a further especially particularly preferred embodiment, the composition comprises poly(methyl vinyl ether-alt-maleic acid) having a number average molecular weight in the range of 70,000 to 90,000 g/mol, and preferably of approximately 80,000 g/mol, serving as component c).

These alternating copolymers can be procured from Ashland (Gantrez 119 AN) or Sigma-Aldrich, for example.

Serving as an advantageous component d), the composition preferably comprises at least one type of cation, selected from the group consisting of the cations of cerium and further lanthanides, chromium, iron, calcium, cobalt, copper, magnesium, manganese, molybdenum, nickel, niobium, tantalum, yttrium, vanadium, lithium, bismuth, zinc and tin, and more preferably iron, manganese, molybdenum and zinc. The composition particularly preferably comprises manganese cations in the +2 oxidation state.

If necessary, the composition according to the invention or the concentrate, depending on the specific requirements or circumstances, additionally also comprises a component e). This component is at least one compound selected from the group consisting of pH value-influencing substances, organic solvents, water-soluble fluorine compounds and nanoparticles.

The concentrate preferably has a content of component e) in the range of 0 to 200 g/l. In the treatment bath, the concentration of component e) is preferably in the range of 0.1 to 20 g/l.

The pH value-influencing substances are preferably selected from the group consisting of nitric acid, sulfuric acid, acetic acid, hydrofluoric acid, ammonium/ammonia, and sodium hydroxide. Nitric acid and/or ammonium is more preferred here.

The organic solvents are preferably selected from the group consisting of methanol and ethanol. In practical experience, methanol and/or ethanol are present as reaction products of the organoalkoxysilane hydrolysis in the treatment baths or concentrates.

The water-soluble fluorine compounds are preferably selected from the group consisting of fluoride-containing compounds and fluoride anions.

While free fluoride is advantageous, in particular, for the initiation of the layer formation, it adversely affects layer adhesion.

For the concentrate, the content of total fluoride is thus preferably in the range of 1.5 to 15 g/l, more preferably 2.5 to 10 g/l, and particularly preferably in the range of 3 to 5 g/l, calculated as $F^-$. For the treatment bath, the content of free fluoride accordingly is preferably in the range of 0.015 to 0.15 g/l, more preferably 0.025 to 0.1 g/l, and particularly preferably in the range of 0.03 to 0.05 g/l The nanoparticles are preferably metal oxide particles, and more preferably metal oxide particles selected from the group consisting of $ZnO$, $SiO_2$, $CeO_2$, $ZrO_2$ and $TiO_2$.

The composition according to the invention or the concentrate preferably also comprises at least one type of cation selected from the group consisting of alkali metal ions, ammonium ions and corresponding compounds. It particularly preferably comprises ammonium ions.

The composition or the concentrate can moreover comprise phosphorus- and oxygen-containing compounds such as phosphates and/or phosphonates. Moreover, it can comprise nitrate.

The content of sulfurous compounds, and of sulfate in particular, and nitrite, however, should preferably be kept as low as possible. The content of sulfurous compounds is particularly preferably less than 100 mg/l, calculated as sulfur. The content of nitrite is particularly preferably less than 5 mg/l.

The metallic surface to be treated, which optionally was first cleaned and/or pickled, can be sprayed with the composition according to the invention, dipped into the same or flooded therewith. It is also possible to apply the composition according to the invention to the metallic surface to be treated manually by way of wiping or brushing or using rollers or rolls (coil coating method). Moreover, it is possible to apply the composition according to the invention to the metallic surface to be treated by way of electrolytic deposition.

The treatment duration for the parts treatment is preferably in the range of 15 seconds to 20 minutes, more preferably 30 seconds to 10 minutes, and particularly preferably in the range of 45 seconds to 5 minutes. The treatment temperature is preferably in the range of 5 to 50, more preferably 15 to 40, and particularly preferably in the range of 25 to 30° C.

The method according to the invention is also suitable for coating strips (coils). The treatment duration is preferably in the range of a few seconds to several minutes here, for example in the range of 1 to 1,000 seconds.

The metallic surfaces to be treated are preferably those based on aluminum, magnesium, iron, steel, zinc, tin, silicon, nickel and/or the alloys thereof.

More preferably, the metallic surface to be treated comprises aluminum or an aluminum alloy, particularly preferably the metallic surface is made of aluminum or an aluminum alloy (aluminum material), and especially particularly preferably it is made of an aluminum alloy.

The method according to the invention is particularly suitable for all aluminum alloys, especially particularly for aluminum-magnesium alloys, and in particular AA5005, and for aluminum-magnesium-silicon alloys, and in particular AA6060 or AA6063. In principle, however, it is suitable for all alloys of what are known as the AA1000, AA2000, AA3000, AA4000, AA5000, AA6000, AA7000 and AA8000er series.

The method according to the invention can be used to coat a mixture of various metallic materials in the same bath (so-called multi metal capability).

The coatings formed in the method according to the invention preferably have a coating weight, as determined by way of X-ray fluorescence (XRF) analysis, of:
i) 0.1 to 50, more preferably 1 to 40, and particularly preferably 2 to 10 mg/m$^2$, based only on component a), calculated as silicon, and/or
ii) 0.5 to 200, more preferably 2 to 50, and particularly preferably 3 to 40 mg/m$^2$, based only on component b), calculated as zirconium.

The coatings produced by way of the method according to the invention provide anti-corrosion properties and serve as adhesion promoters for further coatings.

They can easily be further coated with at least one primer, paint, adhesive and/or a paint-like organic composition. Preferably, at least one of these further coatings can be hardened by way of heating and/or irradiation.

The coatings produced by way of the method according to the invention are preferably rinsed prior to further treatment so as to remove excess polymer and interfering ions from the metallic surface. The first further coating can be applied using a wet-on-wet method.

The paint applied can be a powder coating, for example based on polyester and/or epoxy resin or polyacrylate or PVDF, a wet paint, for example based on a polyacrylate dispersion, or PVDF, or an electrodip coat.

Especially in the case of aluminum materials, in particular in the case of aluminum-magnesium alloys such as AA5005 or aluminum-magnesium-silicon alloys such as AA6060, significantly improved adhesion of powder coatings, and in particular those based on polyesters, epoxy resin or the mixtures thereof, and of wet paints based on a polyacrylate dispersion, was observed after coating by way of the method according to the invention.

This becomes apparent, for example, from the comparison with the treatment with an acidic aqueous composition that differs from the composition according to the invention only by comprising polyacrylate, and not the copolymer according to the invention.

The metallic substrates coated by way of the method according to the invention can be used, for example, in the automotive industry, for rail vehicles, in the aerospace industry, in apparatus engineering, in mechanical engineering, in the construction industry, in the furniture industry, for the production of guard rails, lamps, profiles, linings or small parts, for the production of auto bodies and body parts, of individual components, of preassembled or joined elements, preferably in the automotive or aerospace industry, for the production of devices or equipment, in particular domestic appliances, control devices, testing devices or design elements, for which reason the present invention also relates to these uses.

The preferred use of the coated metallic substrates is in the field of aluminum finishing, which is to say architectural design elements made of aluminum or aluminum alloys in the interior and exterior areas, and in particular in window, facade and roof construction.

The present invention is to be illustrated by the following exemplary embodiments, which shall not be interpreted to be limiting.

EXEMPLARY EMBODIMENTS i) Substrates and Pretreatment

Substrates

The substrates used were metal sheets (10.5×19 cm) made of the aluminum-magnesium alloy AA5005, metal sheets (10.5×19 cm) made of the steel ZM 150, metal sheets (10.5×19 cm) made of cold-rolled steel (CRS), metal sheets made of hot-dip galvanized (HDG) steel, and profiles (12×6 cm) made of the aluminum-magnesium-silicon alloy AA6060.

Cleaning

In all examples and comparative examples, Gardoclean® T 5374/2 (Chemetall; contains phosphate, borate and surfactant) was used as a mildly alkaline immersion cleaner. For this purpose, 30 g/l was prepared in a 50-liter bath, heated to 60° C., and the substrates were cleaned for 3 minutes, while being stirred moderately, at a pH value between 9.5 and 10.5. Thereafter, the substrates were cascade rinsed with water and transferred directly to the pickling treatment.

Pickling

In all examples (except for B36 and B37: no pickling) and comparative examples, a dip bath using Gardoclean® T 5491 (Chemetall; contains sulfuric acid and surfactant) was used as a highly acidic pickle. For this purpose, 25 g/l Gardoclean® T 5491 was mixed with 12 g/l Gardobond® 7269 additive (Chemetall; contains hydrofluoric acid) in the 50-liter batch and heated to 45° C. While being stirred moderately, the substrates were pickled at a pH value of less than 2 until the desired removal by way of pickling was reached. In general, this was 1 g/m$^2$. Thereafter, the substrates were cascade rinsed with demineralized water directly prior to the immediately following conversion treatment.

Conversion Treatment (According to the Invention)

For the conversion bath, various amounts of Oxsilan® AL 0510 (Chemetall; contains 2-aminoethyl-3-aminopropyltrimethoxysilane and bis(trimethoxysilylpropyl)amine) and Oxsilan®9905 additive (Chemetall; contains fluoride, a zirconium compound and a manganese compound) were prepared in a 50-liter batch. The bath temperature was set to 30° C. in each case. The pH value and the fluoride content were set by adding diluted ammonia solution and diluted ammonium fluoride solution. The aluminum content was set by adding aluminum nitrate ($Al(NO_3)_3 \times 9H_2O$; Merck) to the fresh Oxsilan® AL 0510 bath. The pH value and the free fluoride content were continuously corrected by adding diluted ammonia solution and diluted ammonium fluoride solution.

If necessary, one of the polymers A, B or C was added to the bath in varying concentrations. Polymer A is poly (methyl vinyl ether-alt-maleic acid) ($M_n$=48,000; Ashland), polymer B is polyacrylic acid ($M_w$=113,000; $M_n$=20,000; DSM), and polymer C is poly(methyl vinyl ether-alt-maleic acid) ($M_n$=80,000; Sigma-Aldrich)

Prior to the throughput of substrates, the finished bath was allowed to age for 2 hours in each case, so as to be able to ensure that a chemical equilibrium was established within the bath. The conversion treatment was carried out for 90 seconds, while stirring moderately. Afterwards, a rinsing step was carried out with demineralized water.

ii) Analytics, Painting, Adhesion, and Anti-Corrosion Properties

The coating weights (SG) listed in Table 1 to Table 3 as well as the cross cut and corrosion results are average values from up to 8 metal sheets/profiles in each case.

X-Ray Fluorescence Analysis

The coating weights (SG) in mg/m² on the pretreated substrates were ascertained by way of X-ray fluorescence (XRF) analysis. The zirconium and silicon layers were measured.

Painting

For Examples B1 to B5, B35 to B37 and Comparative Examples VB1 to VB5, the powder coating Interpon D1036 (Akzo Nobel; paint D in Table 3) was used, for Examples B6 to B34 the wet paints VERNICRON (Monopol Colors; paint A in Table 3) as well as Skincoat (RAL 9016) and Skincoat 8502 (RAL 9005) (each Mechernich/HD-Wahl; paints B and C in Table 3) were used. The layer thickness of the powder coating layer was determined by way of ultrasonic adsorption. It was in the range of 60 to 120 μm.

To determine the adhesion of powder coatings, appropriately painted samples were boiled in water, for example, provided with cross cuts, and then subjected to a reverse impact test. The lower the paint peel-off, the higher the adhesion of the paint was considered.

Boiling Test

After being painted, the substrates were stored for 24 hours. Afterwards, a boiling test was carried out for 2 hours in demineralized water in accordance with GSB AL 631 (International Quality Regulations for the Coating of Aluminum Building Components of Aug. 5, 2013).

Cross Cut Test

After the boiling test, the metal sheets were temporarily stored at room temperature for 1 hour. Thereafter, cross cut tests were carried out in accordance with DIN EN ISO 2409 (in the version of 2013). The adhesion was then determined either immediately, or after the reverse impact test, wherein "0" represents the best-possible value and "5" represents the worst-possible value. A value of 0 or 1 represents a good result.

Impact Test

For the impact test, a device in accordance with ASTM D2794 (in the version of 2010) having a ball diameter of 15.9 mm was used. The impact took place from a drop height of 25 cm (regular GSB requirement) or 50 cm (twice the GSB requirement).

Corrosion Tests

In addition, three different corrosion tests were carried out:

the determination of the resistance to humidity—Part 2: Procedure for exposing test specimens in condensation-water atmospheres (CH test) in accordance with DIN EN ISO 6270-2 CH (in the version of 2005);

the acetic acid salt spray test (AASS test) in accordance with DIN EN ISO 9227 (in the version of 2012); and the filiform test (using HCl) in accordance with DIN EN 3665 (in the version of 1997). During the filiform test, the defects analogous to the average infiltration in accordance with DIN EN ISO 4628-8 (in the version of 2013) or LPV 4 (in the version of 2012) were determined.

iii) Results and Discussion

Table 1 shows that very good cross cut results ("0" or "0-1") can be achieved after powder coating when using a composition (B1 to B5) comprising a polymer A according to the invention, while compositions not according to the invention, which do not comprise a polymer (VB1 to VB4) or polymer B (VB5), result in very poor values in the cross cut test ("4" or "5").

It is apparent from Table 2 that the addition of polymer B, which is not according to the invention, to the treatment solution allows a certain improvement in the corrosion results to be achieved during the AASS and filiform tests (lower values for Del.$_{max}$ or I in the case of VB5 compared to VB1). As a result of the use of polymer A (B1 and B2) according to the invention, however, this improvement is more pronounced (AASS test: lower value for Del.$_{max}$ and filiform test: considerably lower values for H and 1).

It is apparent from Table 3 that very good cross cut results can also be achieved in the case of wet paints using various paints (paints A, B and C) and on different substrates (AA5005 and AA6060). Additionally, Table 3 demonstrates that the method according to the invention is not limited to aluminum materials, but excellent cross cut results can also be achieved with other metal substrates (B35 to B37).

Moreover, it is apparent from Tables 1 and 3 that the method according to the invention can also be carried out successfully when the content of aluminum is high.

In all (comparative) examples listed in Table 1 and Table 2, the substrate used was the aluminum-magnesium alloy AA5005, and the powder coating used was Interpon D1036 (Akzo Nobel).

The bath concentration of fluorine (F) was 30 mg/l in all examples of Table 3 (B35: 80 mg/l), and that of aluminum (Al) was 150 mg/l (B35: 500 mg/l).

TABLE 1

| (Comp.) Example | Bath concentration (mg/l) | | | | | pH | Polym. (g/l) | SG (mg/m$^2$) | | Cross cut (0-5) |
|---|---|---|---|---|---|---|---|---|---|---|
| | Zr | Si | F | Al | Mn | | | Zr | Si | |
| VB1 | 200 | 30 | 30 | 150 | 170 | 4.2 | — | 42 | 6 | 4-5 |
| B1 | 200 | 30 | 30 | 150 | 170 | 4.2 | A: 0.085 | 39 | 3 | 0-1 |
| B2 | 200 | 30 | 30 | 150 | 170 | 4.2 | A: 0.68 | 21 | 2 | 0 |
| VB2 | 170 | 10 | 90 | 550 | 145 | 3.8 | — | 15 | 2 | 5 |
| B3 | 170 | 10 | 90 | 550 | 145 | 3.8 | A: 0.17 | n.n. | n.n. | 0 |
| VB3 | 170 | 10 | 30 | 550 | 145 | 4.8 | — | 42 | 2 | 4 |
| B4 | 170 | 10 | 30 | 550 | 145 | 4.8 | A: 0.17 | n.n. | n.n. | 0 |
| VB4 | 230 | 10 | 30 | 550 | 195 | 4.3 | — | 51 | 2 | 5 |
| B5 | 230 | 10 | 30 | 550 | 195 | 4.3 | A: 0.17 | 45 | 2 | 0 |
| VB5 | 230 | 30 | 30 | 150 | 170 | 4.2 | B: 0.17 | 41 | 2 | 5 |

TABLE 2

| (Comp.) Example | Polymer (g/l) | CH Test | | AASS Test | | Filiform Test | | |
|---|---|---|---|---|---|---|---|---|
| | | Del.$_{max}$ (mm) | Blister | Del.$_{max}$ (mm) | Blister | I (mm) | H (1/10 mm) | F |
| VB1 | — | 0 | 0 | 0.9 | 0 | 0.45 | 6.0 | 0.24 |
| B1 | A: 0.1 | 0 | 0 | 0.7 | 0 | 0.42 | 4.3 | 0.18 |
| B2 | A: 0.8 | 0 | 0 | 0.7 | 0 | 0.41 | 3.2 | 0.13 |
| VB5 | B: 0.2 | n.n. | n.n. | 0.8 | 0 | 0.41 | 6.0 | 0.24 |

TABLE 3

| Ex. | Subst. | Paint | Bath Conc. (mg/l) | | | pH | Polym. (g/l) | SG (mg/m$^2$) | | | Cross cut (0-5) | |
|---|---|---|---|---|---|---|---|---|---|---|---|---|
| | | | Zr | Si | Mn | | | Zr | Si | — | 25 cm | 50 cm |
| B6 | AA5005 | A | 200 | 30 | 170 | 4.2 | A: 0.17 | 22 | 2 | n.n. | 0-1 | 1 |
| B7 | AA5005 | A | 200 | 30 | 170 | 4.2 | C: 0.034 | 37 | 3 | n.n. | 1 | 0-1 |
| B8 | AA6060 | B | 200 | 30 | 170 | 4.2 | A: 0.17 | 1 | 22 | 1 | n.n. | n.n. |
| B9 | AA6060 | B | 200 | 30 | 170 | 4.2 | A: 0.34 | 1 | 17 | 1 | n.n. | n.n. |
| B10 | AA6060 | B | 200 | 30 | 170 | 4.2 | A: 0.68 | 1 | 9 | 1 | n.n. | n.n. |
| B11 | AA6060 | B | 80 | 30 | 65 | 4.0 | A: 0.17 | 1 | 7 | 1 | n.n. | n.n. |
| B12 | AA6060 | B | 80 | 30 | 65 | 4.0 | A: 0.34 | 1 | 7 | 1 | n.n. | n.n. |
| B13 | AA6060 | B | 80 | 30 | 65 | 4.0 | A: 0.68 | 1 | 5 | 1 | n.n. | n.n. |
| B14 | AA6060 | B | 80 | 10 | 65 | 4.2 | A: 0.17 | <1 | 12 | 1 | n.n. | n.n. |
| B15 | AA6060 | B | 80 | 10 | 65 | 4.2 | A: 0.34 | 1 | 12 | 1 | n.n. | n.n. |
| B16 | AA6060 | B | 80 | 10 | 65 | 4.2 | A: 0.68 | 1 | 4 | 1 | n.n. | n.n. |
| B17 | AA6060 | C | 50 | 30 | 40 | 4.2 | A: 0.17 | <1 | 23 | 0 | n.n. | n.n. |
| B18 | AA6060 | C | 50 | 30 | 40 | 4.2 | A: 0.34 | <1 | 14 | 0 | n.n. | n.n. |
| B19 | AA6060 | C | 50 | 30 | 40 | 4.2 | A: 0.68 | <1 | 8 | 0 | n.n. | n.n. |
| B20 | AA5005 | C | 100 | 30 | 85 | 4.2 | A: 0.17 | 1 | 22 | n.n. | 1 | 1 |
| B21 | AA5005 | C | 100 | 30 | 85 | 4.2 | A: 0.34 | 1 | 12 | n.n. | 0 | 1 |
| B22 | AA5005 | C | 100 | 30 | 85 | 4.2 | A: 0.68 | <1 | 6 | n.n. | 0 | 1 |
| B23 | AA6060 | C | 100 | 30 | 85 | 4.2 | A: 0.17 | 1 | 19 | 1 | n.n. | n.n. |
| B24 | AA6060 | C | 100 | 30 | 85 | 4.2 | A: 0.34 | 1 | 12 | 0 | n.n. | n.n. |
| B25 | AA6060 | C | 100 | 30 | 85 | 4.2 | A: 0.68 | 1 | 6 | 0-1 | n.n. | n.n. |
| B26 | AA6060 | C | 100 | 30 | 85 | 4.2 | A: 0.085 | 10 | 32 | 1 | n.n. | n.n. |
| B27 | AA5005 | C | 50 | 15 | 40 | 4.2 | A: 0.085 | 2 | 26 | n.n. | 1 | 1 |
| B28 | AA5005 | C | 50 | 15 | 40 | 4.2 | A: 0.17 | 1 | 20 | n.n. | 1 | 1 |
| B29 | AA6060 | C | 50 | 15 | 40 | 4.2 | A: 0.085 | 10 | 27 | 1 | n.n. | n.n. |
| B30 | AA6060 | C | 50 | 15 | 40 | 4.2 | A: 0.17 | 9 | 19 | 1 | n.n. | n.n. |
| B31 | AA5005 | C | 50 | 30 | 40 | 4.2 | A: 0.17 | 1 | 19 | n.n. | 0-1 | 1 |
| B32 | AA6060 | C | 50 | 30 | 40 | 4.2 | A: 0.085 | 8 | 25 | 1 | n.n. | n.n. |
| B33 | AA6060 | C | 50 | 30 | 40 | 4.2 | A: 0.17 | 9 | 19 | 0 | n.n. | n.n. |
| B34 | AA5005 | C | 100 | 30 | 85 | 4.2 | A: 0.17 | 2 | 28 | n.n. | 0 | 0 |
| B35 | ZM 150 | D | 250 | 40 | 210 | 4.5 | A: 0.17 | 57 | 1 | n.n. | 0-1 | 1 |
| B36 | CRS | D | 200 | 30 | 170 | 4.2 | A: 0.17 | 50 | 3 | 0 | n.n. | n.n. |
| B37 | HDG | D | 200 | 30 | 170 | 4.2 | A: 0.17 | 49 | 3 | 0 | n.n. | n.n. |

The invention claimed is:
1. An acidic aqueous composition for coating metallic surfaces, characterized by comprising, in addition to water:
   a) at least one compound selected from the group consisting of organoalkoxysilanes, organosilanols, polyorganosilanols, organosiloxanes and polyorganosiloxanes;
   b) at least one compound selected from the group consisting of titanium, zirconium, hafnium and aluminum compounds and complex fluorides of silicon; and
   c) an adhesion mediator for electrostatically depositing on a metallic surface, the adhesion mediator consisting of a copolymer, which is stable at least at a pH value below 6 and which comprises monomer units comprising at least one carboxylic acid group and/or phosphonic acid group, and monomer units not containing an acid group, in an alternating configuration;
   wherein component a) has a concentration in the range of 1 to 200 mg/l, component b) has a concentration in the range of 0.05 to 4 g/l, and component c) has a concentration in the range of 0.02 to 2 g/l.

2. The composition according to claim 1, characterized by additionally comprising d) at least one type of cation, selected from the group consisting of cations of metals of secondary groups 1 to 3 and 5 to 8, including lanthanides, and of main group 2 of the periodic table of elements, as well as of lithium, bismuth and tin and/or at least one corresponding compound.

3. The composition according to claim 1, characterized by having a pH value in the range of 2 to 5.5.

4. The composition according to claim 2, characterized in that component a) has a concentration in the range of 5 to 100 mg/l, component b) has a concentration in the range of 0.15 to 1.5 g/l, component c) has a concentration in the range of 0.07 to 0.7 g/l, and component d) has a concentration in the range of 0.02 to 2 g/l.

5. The composition according to claim 1, characterized in that component a) is at least one organoalkoxysilane, organosilanol, polyorganosilanol, organosiloxane and/or polyorganosiloxane, each comprising at least one amino group, urea group, imido group, imino group and/or ureido group per organoalkoxysilane or organosilanol unit.

6. The composition according to claim 1, characterized in that component b) is at least one complex fluoride selected from the group consisting of the complex fluorides of titanium, zirconium, hafnium, aluminum and silicon.

7. The composition according to claim 1, characterized in that in component c) the monomer units comprising at least one carboxylic acid group and/or phosphonic acid group comprise at least one carboxylic acid group, and the monomer units not containing an acid group are alkylene, styrene, vinyl alcohol, vinyl acetate, vinyl ether, ethyleneimine, (meth)acrylate and/or (meth)acrylamide.

8. The composition according to claim 1, characterized in that in component c) the monomer units comprising at least one carboxylic acid group and/or phosphonic acid group each comprise two carboxylic acid groups, and the monomer units not containing an acid group are vinyl ethers.

9. The composition according to claim 1, characterized in that in component c) the at least one copolymer has a degree of polymerization, based on two monomer units in an alternating configuration, of 25 to 5700 and/or has a number average molecular weight of 5,000 to 1,000,000 g/mol.

10. The composition according to claim 2, characterized in that component d) is at least one type of cation, selected from the group consisting of cations of cerium and further lanthanides, chromium, iron, calcium, cobalt, copper, magnesium, manganese, molybdenum, nickel, niobium, tantalum, yttrium, vanadium, lithium, bismuth, zinc and tin.

11. The composition according to claim 2, characterized by also comprising a component e), which is at least one compound selected from the group consisting of pH value-influencing substances, organic solvents, water-soluble fluorine compounds and nanoparticles.

12. The composition according to claim 1, characterized in that the composition has a free fluoride content in the range of 0.015 to 0.15 g/l.

13. The composition according to claim 1, characterized by further comprising at least one type of cation selected from the group consisting of alkali metal ions, ammonium ions and corresponding compounds.

14. The composition according to claim 1, which is in the form of a concentrate.

15. A method for coating metallic surfaces, characterized by bringing a metallic surface into contact with a composition according to claim 1, to form a coating on the metallic surface.

16. The method according to claim 15, characterized in that the metallic surface to be treated comprises aluminum or an aluminum alloy.

17. The method according to claim 15, characterized in that the coating on the metallic surface has a coating weight of:
   i) 0.1 to 500 mg/m$^2$, based only on component a), calculated as silicon, and/or
   ii) 0.5 to 200 mg/m$^2$, based only on component b), calculated as zirconium.

18. The method according to claim 15, characterized in that the coating on the metallic surface is rinsed prior to further treatment.

19. The method according to claim 15 wherein a metal substrate comprising the coating on the metallic surface is part of or is incorporated into rail vehicles, furniture, guard rails, lamps, profiles, linings or small parts, auto bodies, auto body parts, preassembled or joined elements, devices or equipment, domestic appliances, control devices, testing devices or design elements.

20. The composition according to claim 14, comprising a treatment bath formed from the concentrate by diluting by a factor of 1:5000 to 1:10.

* * * * *

UNITED STATES PATENT AND TRADEMARK OFFICE
CERTIFICATE OF CORRECTION

| | |
|---|---|
| PATENT NO. | : 11,346,002 B2 |
| APPLICATION NO. | : 15/534637 |
| DATED | : May 31, 2022 |
| INVENTOR(S) | : Sebralla et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1270 days.

Signed and Sealed this
Fifteenth Day of November, 2022

Katherine Kelly Vidal
*Director of the United States Patent and Trademark Office*